US012073980B2

(12) United States Patent
Misaki

(10) Patent No.: US 12,073,980 B2
(45) Date of Patent: Aug. 27, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takashi Misaki, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 541 days.

(21) Appl. No.: 17/277,110

(22) PCT Filed: Sep. 9, 2019

(86) PCT No.: PCT/JP2019/035364
§ 371 (c)(1),
(2) Date: Mar. 17, 2021

(87) PCT Pub. No.: WO2020/059558
PCT Pub. Date: Mar. 26, 2020

(65) Prior Publication Data

US 2022/0115175 A1 Apr. 14, 2022

(30) Foreign Application Priority Data

Sep. 21, 2018 (JP) ................................ 2018-178045

(51) Int. Cl.
*H01F 27/26* (2006.01)
*H01F 27/25* (2006.01)
(Continued)

(52) U.S. Cl.
CPC ........... *H01F 27/26* (2013.01); *H01F 27/255* (2013.01); *H01F 27/2823* (2013.01); *H01F 41/0246* (2013.01)

(58) Field of Classification Search
CPC .... H01F 27/26; H01F 27/255; H01F 27/2823; H01F 41/0246
See application file for complete search history.

(56) References Cited

U.S. PATENT DOCUMENTS

2016/0111203 A1* 4/2016 Yamamoto .............. H01F 37/00 336/212
2016/0314888 A1* 10/2016 Zheng ....................... H01F 3/10
2019/0189339 A1 6/2019 Yamamoto et al.

FOREIGN PATENT DOCUMENTS

JP 2013026492 A * 2/2013
JP 2013179259 A * 9/2013 ........... H01F 27/022

OTHER PUBLICATIONS

International Search Report, Application No. PCT/JP2019/035364, dated Oct. 15, 2019. ISA/Japan Patent Office.

* cited by examiner

*Primary Examiner* — Malcolm Barnes
(74) *Attorney, Agent, or Firm* — Honigman LLP

(57) ABSTRACT

A reactor includes a coil including a winding portion; a magnetic core including an inner core portion and an outer core portion; and an inner resin portion filled between an inner circumferential surface of the winding portion and an outer circumferential surface of the inner core portion. The outer core portion includes a plurality of core pieces coupled in a vertical direction via a dividing plane that intersects the vertical direction, and the inner core portion does not have a dividing plane passing therethrough from a surface thereof on one end side toward a surface thereof on another end side in the inward-outward direction.

9 Claims, 8 Drawing Sheets

(51) Int. Cl.

| | |
|---|---|
| ***H01F 27/255*** | (2006.01) |
| ***H01F 27/28*** | (2006.01) |
| ***H01F 41/02*** | (2006.01) |

REACTOR

CROSS-REFERENCE TO RELATED APPLICATIONS

This application is the U.S. national stage of PCT/JP2019/035364 filed on Sep. 9, 2019, which claims priority of Japanese Patent Application No. JP 2018-178045 filed on Sep. 21, 2018, the contents of which are incorporated herein.

TECHNICAL FIELD

The present disclosure relates to a reactor.

BACKGROUND

The reactor of JP 2017-212346A includes a coil, a magnetic core, and an inner resin portion. The coil includes a pair of winding portions. The magnetic core includes an inner core portion disposed inside each of the winding portions, and an outer core portion disposed outside the winding portion. Each of the core portions is made of a powder compact containing magnetic powder, or a composite material in which soft magnetic powder is dispersed in a resin. The inner resin portion is filled between the inner circumferential surface of the winding portion and the outer circumferential surface of the inner core portion.

This reactor is produced by filling the constituent resin of the inner resin portion between the winding portion and the inner core portion from the outer side (the side opposite to the inner core portion) of the outer core portion for a combined body formed by combining the coil and the magnetic core. In order to facilitate the filling of the constituent resin of the inner resin portion between the winding portion and the inner core portion from the outer side of the outer core portion, the outer core portion has a through hole formed therein that is open to the inner core portion side thereof (the inner side) and the opposite side (the outer side).

It is desirable to reduce the gap between the coil and the inner core portion of a reactor. This is because the size of the coil can be reduced by making the size of the inner core portion constant, and it is thus possible to miniaturize the reactor. Alternatively, the magnetic path area of the inner core portion can be increased by making the size of the coil constant, and it is thus possible to enhance the magnetic properties thereof.

If the above-described gap is reduced, it is difficult to fill the constituent resin of the inner resin portion between the winding portion and the inner core portion from the outer side of the outer core portion for a combined body formed by combining the coil and the magnetic core. To facilitate the filling of the constituent resin, it is necessary to increase the filling pressure and the holding pressure for the constituent resin. The outer core portion is disposed midway along the filling path of the constituent resin. Therefore, if the filling pressure and the holding pressure for the constituent resin are increased, the load on the outer core portion due to contact with the constituent resin is increased. A large load acting on the outer core portion may cause damage such as cracking of the outer core portion.

Therefore, it is an object of the present disclosure to provide a reactor in which a resin sufficiently fills in a gap between the coil and the inner core portion even when the gap is small, without causing damage to the outer core portion.

SUMMARY

A reactor according to the present disclosure is a reactor including: a coil including a winding portion formed by winding a winding wire; a magnetic core including an inner core portion disposed inside the winding portion, and an outer core portion disposed outside the winding portion; and an inner resin portion filled between an inner circumferential surface of the winding portion and an outer circumferential surface of the inner core portion. Wherein, when a vertical direction is a direction orthogonal both to an inward-outward direction of the outer core portion, assuming that a side of the outer core portion that faces the inner core portion is an inner side, and a side opposite to the inner side is an outer side, and to a direction of a magnetic flux excited in the outer core portion, the outer core portion includes a plurality of core pieces coupled in the vertical direction via a dividing plane that intersects the vertical direction, and the inner core portion does not have a dividing plane passing therethrough from a surface thereof on one end side toward a surface thereof on another end side in the inward-outward direction.

Effects of the Present Disclosure

A reactor according to the present disclosure allows a resin to sufficiently fill in a gap between the coil and the inner core portion even when the gap is small, without causing damage to the outer core portion.

DESCRIPTION OF EMBODIMENTS OF THE PRESENT DISCLOSURE

Figure 1:
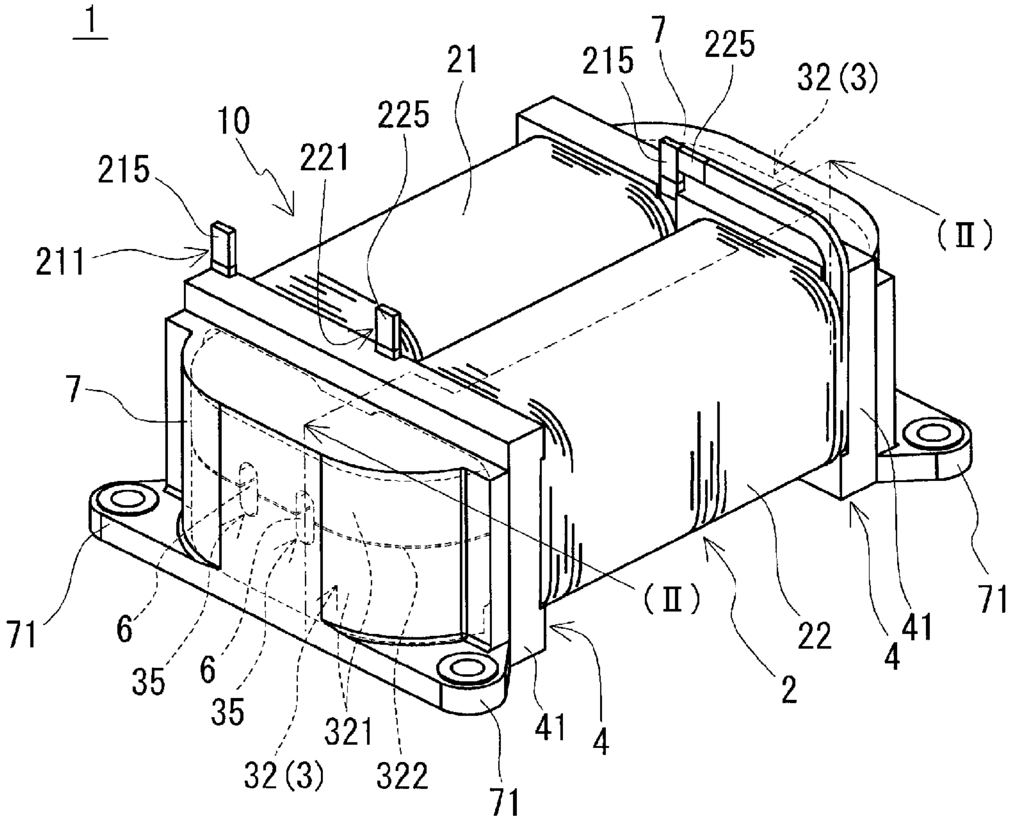
FIG. 1 is an overall perspective view schematically showing a reactor according to Embodiment 1.

The present disclosure relates to an increase in the filling pressure and the holding pressure when filling the constituent resin of an inner resin portion between a winding portion and an inner core portion from the outer side of an outer core portion for a combined body formed by combining a coil and a magnetic core. As a result, it has been found that the outer core portion may crack so as to be divided in a vertical direction (may be referred to simply as the “cracking of the outer core portion” hereinafter). The vertical direction refers to a direction orthogonal both to an inward-outward direction of the outer core portion, assuming that a side of the outer core portion that faces the inner core portion is an inner side, and a side opposite to the inner side is an outer side, and to a direction of the magnetic flux excited in the outer core portion. In particular, it has been found that the outer core portion is likely to crack when a through hole serving as a filling path of the constituent resin of the inner resin portion is formed in the outer core portion as in the case of JP 2017-212346A. The outer core portion is formed of a powder compact or a composite material. These materials are vulnerable to bending stress and tensile stress. This is presumably because a large bending stress acts on the outer core portion due to contact with the constituent resin of the inner resin portion at the time of filling, or a large tensile stress acts on the outer core portion as a result of the resin that has been filled in the through hole forcing the inner surface of the through hole to expand outward.

Extensive studies have been conducted as to how to inhibit the cracking of the outer core portion even when the above-described filling pressure and the above-described holding pressure are increased. As a result, it has found that, by dividing the outer core portion in the vertical direction by forming a dividing plane that divides the outer core portion in the vertical direction, the cracking of the outer core portion can be inhibited even when the above-described filling pressure and the above-described holding pressure are increased.

The present disclosure is based on these findings. First, embodiments of the present disclosure will be listed and described.

A reactor according to an embodiment of the present disclosure is a reactor including: a coil including a winding portion formed by winding a winding wire; a magnetic core including an inner core portion disposed inside the winding portion, and an outer core portion disposed outside the winding portion; and an inner resin portion filled between an inner circumferential surface of the winding portion and an outer circumferential surface of the inner core portion. Wherein, when a vertical direction is a direction orthogonal both to an inward-outward direction of the outer core portion, assuming that a side of the outer core portion that faces the inner core portion is an inner side, and a side opposite to the inner side is an outer side, and to a direction of a magnetic flux excited in the outer core portion, the outer core portion includes a plurality of core pieces coupled in the vertical direction via a dividing plane that intersects the vertical direction, and the inner core portion does not have a dividing plane passing therethrough from a surface thereof on one end side toward a surface thereof on another end side in the inward-outward direction.

With the above-described configuration, the constituent resin of the inner resin portion can be sufficiently filled in a gap between the coil and the inner core portion even when the gap is small. The inner resin portion can be formed by filling the constituent resin of the inner resin portion between the winding portion and the inner core portion from the outer side of the outer core portion for a combined body formed by combining a coil and a magnetic core. The reason that the above-described constituent resin can be sufficiently filled in the above-described gap is that the filling pressure and the holding pressure for the above-described constituent resin can be increased. Because the outer core portion has the dividing plane that intersects the vertical direction, the core pieces can independently behave with the dividing plane interposed therebetween even when the above-described filling pressure and the above-described holding pressure are increased. Accordingly, the load acting on the outer core portion due to, for example, contact with the constituent resin of the inner resin portion can be reduced. Accordingly, it is possible to inhibit the outer core portion from cracking so as to be divided in the vertical direction.

With the above-described configuration, the inner core portion does not have a dividing plane passing therethrough from a surface thereof on one end side toward a surface thereof on another end side in the inward-outward direction, and it is thus possible to suppress the reduction in the magnetic properties. If the inner core portion has the above-described dividing plane, the inner core portion may be displaced in the above-described inward-outward direction upon contact with the constituent resin of the inner resin portion at the time of forming the inner resin portion. However, the inner core portion does not have the above-described dividing plane. That is, the inner core portion is not divided either in the vertical direction or a horizontal direction. The horizontal direction refers to a direction orthogonal both to the vertical direction of the inner core portion, and to the direction of the magnetic flux in inner core portion (inward-outward direction). Accordingly, there is no possibility that inner core portion will be displaced in the above-described inward-outward direction at the time of forming the inner resin portion.

Furthermore, with the above-described configuration, the gap between the coil and the inner core portion can be reduced. This is because, as described above, the constituent resin of the inner resin portion can be sufficiently filled in a gap between the coil and the inner core portion even when the gap is small. Accordingly, the size of the coil can be reduced by making the size of the inner core portion constant, and it is thus possible to miniaturize the reactor. Alternatively, the magnetic path area of the inner core portion can be increased by making the size of the coil constant, and it is thus possible to enhance the magnetic properties thereof.

In an embodiment of the reactor, the dividing plane of the outer core portion includes a surface parallel to the inward-outward direction.

With the above-described configuration, the constituent resin of the inner resin portion is likely to sufficiently fill in a gap between the coil and the inner core portion even when the gap is small, as compared with when the dividing plane includes a surface (nonparallel surface) that intersects the vertical direction of the outer core portion, and that intersects the inward-outward direction of the outer core portion. When the dividing plane is parallel to the resin filling direction, the core pieces are easily caused to behave in a direction in which they are separated from each other, as compared with when the dividing plane is nonparallel. Accordingly, the load acting on the outer core portion due to, for example, contact with the constituent resin of the inner resin portion at the time of filling is easily reduced even when the above-described filling pressure and the above-described holding pressure are increased. That is, the cracking of the outer core portion is easily inhibited.

In an embodiment of the reactor, the dividing plane of the outer core portion includes a surface orthogonal to the vertical direction.

With the above-described configuration, the constituent resin of the inner resin portion is likely to sufficiently fill in a gap between the coil and the inner core portion even when the gap is small, as compared with when the dividing plane includes a surface that non-orthogonally intersects the vertical direction of the outer core portion, and that is parallel to the inward-outward direction. When the dividing plane is orthogonal to the vertical direction, the core pieces are easily caused to behave in a direction in which they are separated from each other, as compared with when the dividing plane non-orthogonally intersects the vertical direction. Accordingly, the load acting on the outer core portion due to, for example, contact with the constituent resin of the inner resin portion at the time of filling is easily reduced even when the above-described filling pressure and the above-described holding pressure are increased. That is, the cracking of the outer core portion is easily inhibited.

In an embodiment of the reactor, the outer core portion includes a hole portion extending therethrough in the inward-outward direction, and the dividing plane of the outer core portion divides the hole portion in the vertical direction.

With the above-described configuration, the constituent resin of the inner resin portion is likely to sufficiently fill in a gap between the coil and the inner core portion even when the gap is small. This is because the above-described filling pressure and the above-described holding pressure can be increased even when the outer core portion includes the hole portion. Because the dividing plane of the outer core portion divides the hole portion in the vertical direction, the tensile stress acting on the outer core portion as a result of the constituent resin of the inner resin portion filled in the hole portion forcing the inner surface of the hole portion to expand outward is easily reduced, even when the above-described filling pressure and the above-described holding pressure are increased. That is, the cracking of the outer core portion is easily inhibited even when the outer core portion includes the hole portion.

In an embodiment of the reactor including the above-described hole portion, the reactor includes: an intermediate resin portion filled in the hole portion; and an outer resin portion that covers an outside of the outer core portion, wherein the inner resin portion and the outer resin portion are coupled via the intermediate resin portion.

With the above-described configuration, the hole portion can be sealed because the intermediate resin portion is provided. Accordingly, water droplets or the like are easily prevented from entering the space between the coil and the inner core portion through the hole portion. In addition, the outer core portion is easily protected from an external environment because the outer resin portion is provided. Furthermore, because the inner resin portion and the outer resin portion are coupled via the intermediate resin portion in the hole portion, the mechanical strength of the reactor (magnetic core) can be increased.

With the above-described configuration, the reactor is excellent in the productivity. The inner resin portion and the outer resin portion are coupled via the intermediate resin portion in the hole portion. The inner resin portion, the intermediate resin portion, and the outer resin portion can be formed by performing molding once. That is, despite including the intermediate resin portion and the outer resin portion in addition to the inner resin portion, the reactor can be obtained by performing resin molding once.

In an embodiment of the reactor, each of the core pieces is formed of one of a powder compact containing soft magnetic powder, or a composite material in which soft magnetic powder is dispersed in a resin.

With the above-described configuration, even when the core pieces are formed of a powder compact or a composite material that tends to crack when the above-described filling pressure and the above-described holding pressure are high, the cracking of the outer core portion is easily inhibited because the outer core portion has the dividing plane.

For the powder compact, the proportion of the soft magnetic powder in the core pieces can be higher than for the composite material. Therefore, the magnetic properties (the relative permeability and the saturation flux density) of the powder compact are easily enhanced.

For the composite material, the content of the soft magnetic powder in the resin can be easily adjusted. Therefore, the magnetic properties (the relative permeability and the saturation flux density) of the composite material are easily adjusted. Moreover, the composite material is more easily formed even in a complex shape, as compared with the powder compact.

The details of embodiments of the present disclosure will be described below with reference to the drawings. In the drawings, the same reference numerals denote the same components.

Embodiment 1

Reactor

A reactor 1 according to Embodiment 1 will be described with reference to FIGS. 1 to 4. The reactor 1 includes a combined body 10 and an inner resin portion 5. The combined body 10 is formed by combining a coil 2 and a magnetic core 3. The coil 2 includes winding portions 21 and 22 formed by winding winding wires 211 and 221. The magnetic core 3 includes inner core portions 31 and outer core portions 32. The inner core portions 31 are disposed inside the winding portions 21 and 22. The outer core portions 32 are disposed outside the winding portions 21 and 22. The inner resin portion 5 is filled between the inner circumferential surface of each of the winding portions 21 and 22 and the outer circumferential surface of the corresponding inner core portion 31. One feature of the reactor 1 lies in that the inner core portion 31 does not have a specific dividing plane, and that the outer core portion 32 includes a plurality of core pieces 321 that are coupled in a specific direction via a specific dividing plane 322. In the following, the configurations of main feature portions of the reactor 1 and portions relating to the feature portions, and main effects thereof will be sequentially described. Thereafter, each of the configurations will be described in detail. Finally, a production method of the reactor 1 will be described. For the sake of convenience of description, the illustration of a part of the configuration of the combined body 10 (e.g., the winding portion 22 in FIG. 1) has been omitted in FIG. 3.

Configurations of Main Feature Portions and Portions Related Thereto Coil

The coil 2 includes a pair of winding portions 21 and 22 (FIG. 1). The winding portions 21 and 22 are formed by spirally winding separate winding wires 211 and 221. Adjacent turns of each of the winding portions 21 and 22 in the present example are in contact with each other. Note that the adjacent turns of each of the winding portions 21 and 22 do not need to be in contact with each other as long as the interval between the adjacent turns is sufficiently narrow to prevent an inner resin portion 5, which will be described later, from leaking out from the space between the adjacent turns. The pair of winding portions 21 and 22 are electrically connected to each other. The details and the electrical connection of the winding wires 211 and 221 will be described later. Each of the winding portions 21 and 22 is a hollow tubular body. The shape of each of the winding portions 21 and 22 in the present example is a rectangular tubular shape. The rectangular tubular shape refers to a shape formed by rounding the corners of each of the winding portions 21 and 22 whose end face has a rectangular shape (including a square shape). The sizes of the winding portions 21 and 22 are identical to each other. The numbers of turns of the winding portions 21 and 22 are identical to each other. The winding directions of the winding portions 21 and 22 are the same. Note that the cross-sectional areas or the numbers of turns of the winding wires 211 and 221 of the winding portions 21 and 22 may be different from each other. The winding portions 21 and 22 are arranged side by side (in parallel) such that the axial directions thereof are parallel.

Magnetic Core

The magnetic core 3 includes a pair of inner core portions 31 and a pair of outer core portions 32. The inner core portions 31 are disposed inside the winding portions 21 and 22. The inner core portions 31 mean portions of the magnetic core 3 that extend along the axial directions of the winding portions 21 and 22. In the present example, both end portions of the magnetic core 3 that extend along the axial directions of the winding portions 21 and 22 protrude to the outside of the winding portions 21 and 22. The protruding portions also constitute a part of the inner core portions 31. The outer core portions 32 are disposed outside the winding portions 21 and 22. That is, the coil 2 is not disposed in the outer core portions 32, and the outer core portions 32 protrude (are exposed) from the coil 2. The magnetic core 3 is formed in a ring shape in which the outer core portions 32 are disposed so as to sandwich the inner core portions 31 disposed spaced apart from each other, and end faces of the inner core portions 31 are brought into contact with inner end faces of the outer core portions 32. The inner core portions 31 and the outer core portions 32 form a closed magnetic circuit when the coil 2 is excited.

Outer Core Portion

Figure 2:
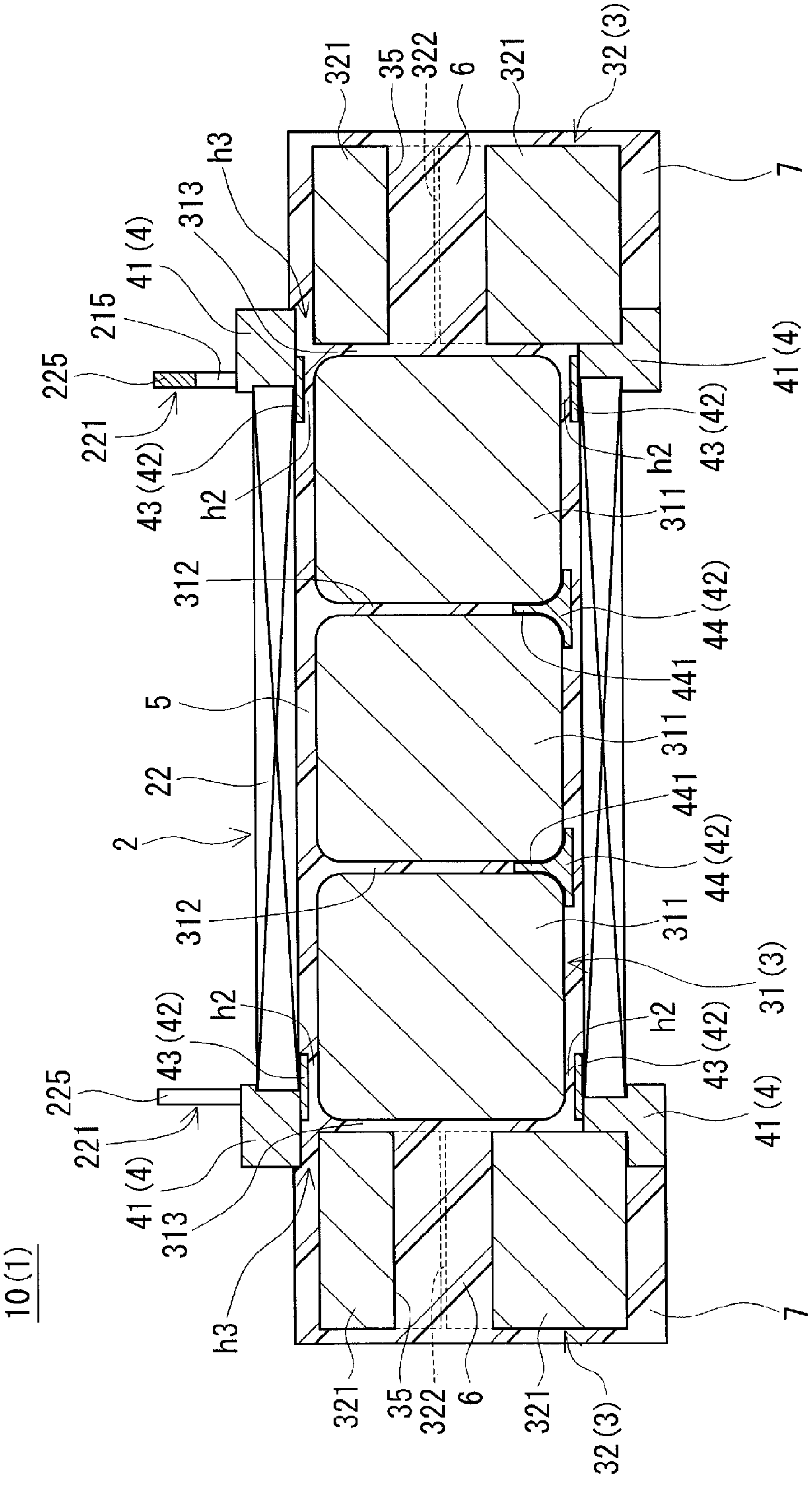
FIG. 2 is a cross-sectional view schematically showing the reactor, taken along the cutting line (II)-(II) in FIG. 1.
Figure 3:
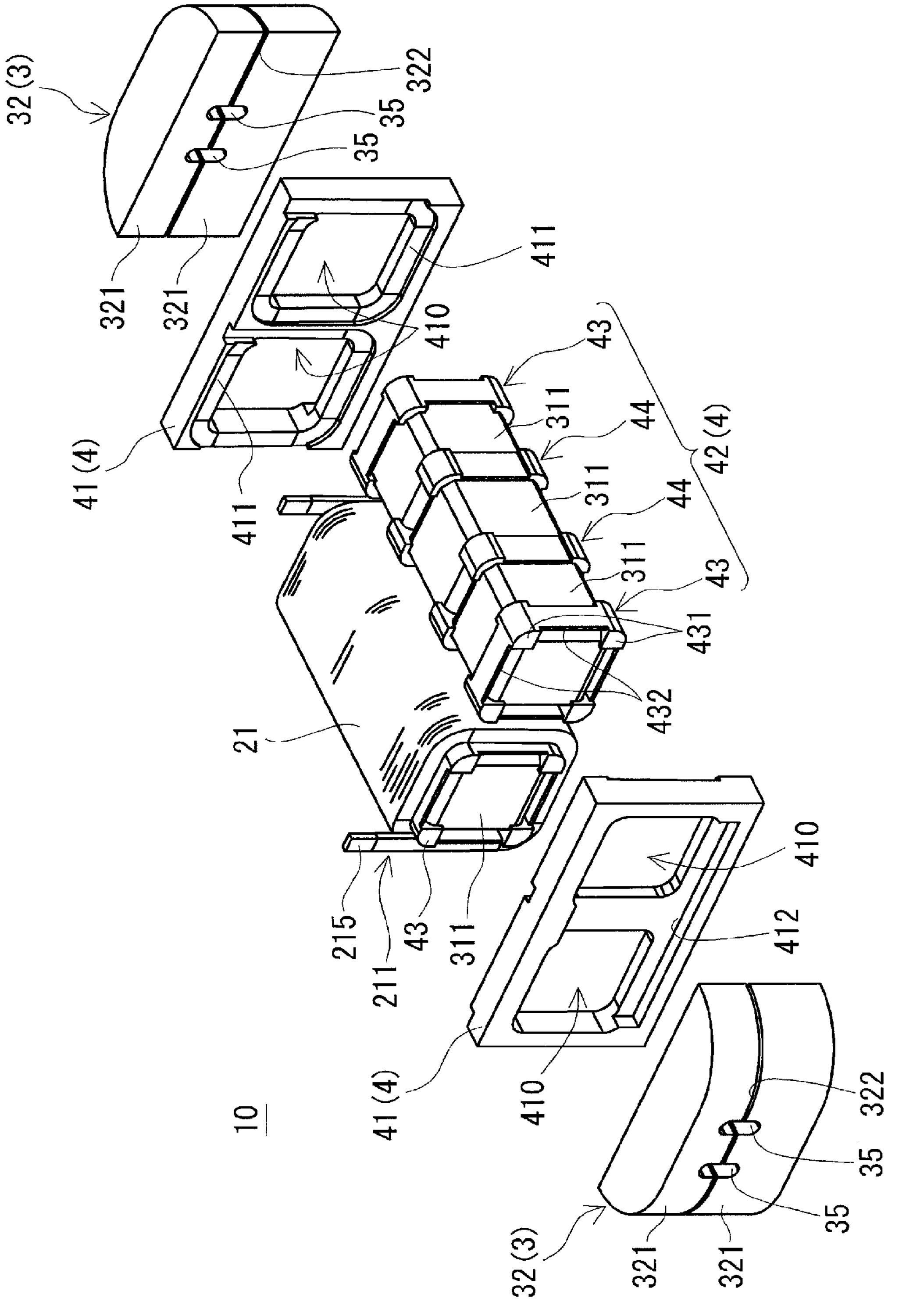
FIG. 3 is a partially exploded perspective view showing a part of a combined body included in the reactor according to Embodiment 1.

In the present example, the outer core portion 32 has the shape of a columnar body having an upper surface and a lower surface each having a substantially dome shape (FIGS. 1, 3). Note that the shape of the outer core portion 32 may be a rectangular parallelepiped shape or the like. It is assumed that a side of the outer core portion 32 that faces the inner core portions 31 is the inner side, and a side opposite to the inner side is the outer side. It is assumed that a direction orthogonal both to the inward-outward direction of the outer core portion 32 and to the direction of the magnetic flux in the outer core portion 32 is the vertical direction (height direction). It is assumed that the direction of the magnetic flux in the outer core portion 32 is a direction extending along the parallel arrangement direction of the pair of winding portions 21 and 22 (the horizontal direction on the plane of the paper in FIG. 4). The height of the outer core portion 32 is larger than that of the inner core portion 31 (FIG. 2). The upper surface of the outer core portion 32 is substantially flush with the upper surface of the inner core portion 31. The lower surface of the outer core portion 32 is substantially flush with the lower surface of the coil 2. Note that the height of the outer core portion 32 may be the same as the height of the inner core portion 31.

Dividing Plane

Figure 4:
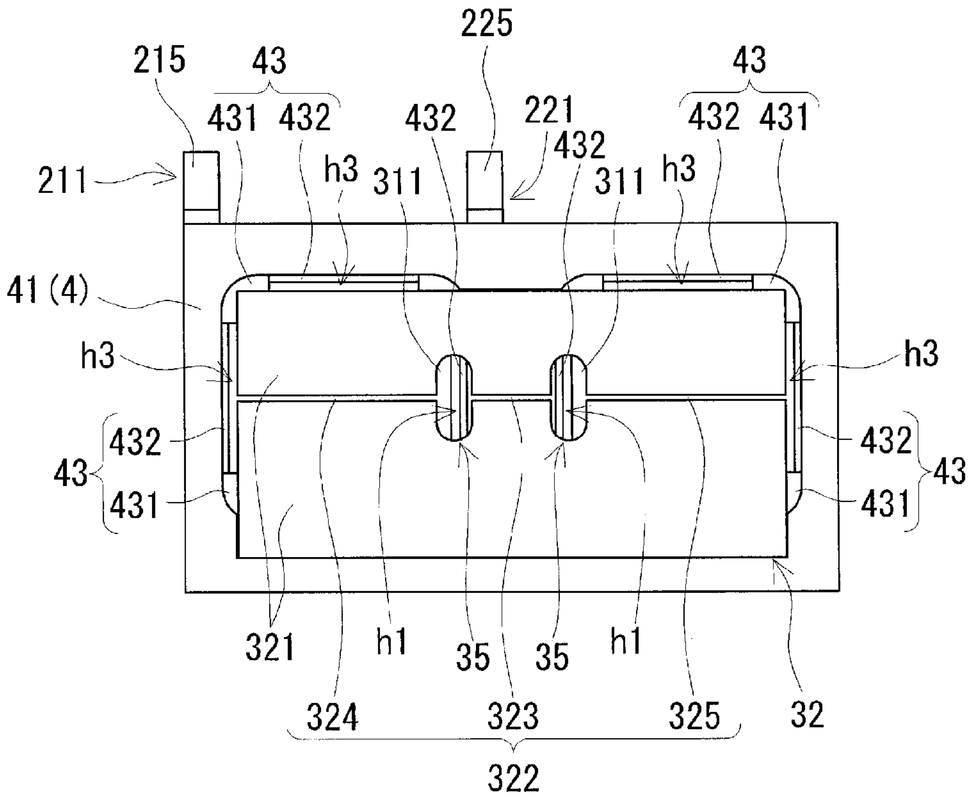
FIG. 4 is a front view schematically showing the combined body included in the reactor according to Embodiment 1, as viewed from the outer side of an outer core portion.

Each of the outer core portions 32 includes a plurality of columnar core pieces 321 (FIGS. 3, 4). The plurality of core pieces 321 are coupled via a dividing plane 322 that intersects the vertical direction. That is, the dividing plane 322 divides the outer core portion 32 in the vertical direction. In the present example, the coupling between the plurality of core pieces 321 is achieved by an outer resin portion 7 (FIGS. 1, 2), which will be described later. The dividing plane 322 is a surface passing through the outer core portion 32 from the outer side toward the inner side thereof (FIG. 2). For the sake of convenience of description, FIGS. 1 to 4 show the dividing plane 322 in an exaggerated manner. Preferably, the core pieces 321 are directly in contact with each other with substantially no gap therebetween. However, a part of an inner resin portion 5, which will be described later, is allowed to be interposed between the core pieces 321 as long as it does not significantly affect the magnetic properties. These also apply to FIGS. 5 to 9, which will be described later. Each core piece 321 is formed of a powder compact or a composite material. The material of the core piece 321 will be described later.

Because each of the outer core portions 32 has the dividing plane 322, the constituent resin of the inner resin portion 5 can be sufficiently filled in a gap between each of the winding portions 21 and 22 and the corresponding inner core portion 31 even when the gap is small. The inner resin portion 5 can be formed by filling the constituent resin of the inner resin portion 5 between each of the winding portions 21 and 22 and the corresponding inner core portion 31 from the outer side of each of the outer core portions 32 for the combined body 10. The reason that the above-described constituent resin can be sufficiently filled in the above-described gap is that the filling pressure and the holding pressure for the constituent resin of the inner resin portion 5 can be increased. Because the outer core portion 32 has the dividing plane 322, the load acting on the outer core portion 32 due to, for example, contact with the constituent resin of the inner resin portion 5 at the time of filling can be reduced even when the filling pressure and the holding pressure described above are increased. This is because the core pieces 321 can behave independently. Accordingly, it is possible to inhibit the outer core portion 32 from cracking so as to be divided in the vertical direction (may simply be referred to as the "cracking of the outer core portion 32 hereinafter).

The number of dividing planes and the number of core pieces 321 of each of the outer core portions 32 can be selected as appropriate. The number of dividing planes 322 in the present example is one. That is, the number of core pieces 321 in the present example is two. Note that the number of dividing planes 322 can be two or more. That is, the number of core pieces 321 can be three or more.

Examples of the configuration of the dividing plane 322 that intersects the vertical direction of the outer core portion 32 and that divides the plurality of core pieces 321 in the vertical direction include the following configurations (1) and (2).

(1) The dividing plane 322 includes a surface (nonparallel surface) that intersects the inward-outward direction of the outer core portion 32. That is, the dividing plane 322 includes a surface (nonparallel surface) that intersects the vertical direction of the outer core portion 32, and that intersects the inward-outward direction of the outer core portion 32.

(2) The dividing plane 322 includes a surface parallel to the inward-outward direction of the outer core portion 32. That is, the dividing plane 322 includes a surface that intersects the vertical direction of the outer core portion 32, and that is parallel to the inward-outward direction of the outer core portion 32.

In the case of adopting the above-described configuration (1), examples of the transverse cross-sectional shape of the dividing plane 322 include a polygonal line shape, a curved shape, and an inclined shape. Examples of the polygonal line shape include a V-shape, a N-shape, and a W-shape. Examples of the curved shape include an arc shape, an S-shape, and a sine wave shape. The transverse cross-sectional shape of the dividing plane 322 refers to the shape of a line represented by an edge of the dividing plane 322 on a first cut surface of the outer core portion 32. The first cut surface of the outer core portion 32 refers to a surface orthogonal to the direction of the magnetic flux in the outer core portion 32 (the parallel arrangement direction of the pair of winding portions 21 and 22). In particular, when the transverse cross-sectional shape of the dividing plane 322 is a V-shape, an N-shape, a W-shape, or a curved shape, the core pieces 321 in the vertical direction can be fitted to each other via a recess and a protrusion defined by the dividing plane 322. Accordingly, the positioning between the core pieces 321 is facilitated. On the first cut surface of the outer core portion 32, end portions of the dividing plane 322 intersect left and right sides of the outer core portion 32.

Preferably, the dividing plane 322 satisfies the above-described configuration (2). This is because, as compared with when the dividing plane 322 satisfies the above-described configuration (1), the constituent resin of the inner resin portion 5 is likely to be filled in a gap between each of the winding portions 21 and 22 and the corresponding inner core portion 31 even when the gap is small. Even when the above-described filling pressure and the above-described holding pressure at the time of forming the inner resin portion 5 are increased, the load acting on the outer core portions 32 due to, for example, contact with the constituent resin of the inner resin portion 5 at the time of filling is easily reduced as compared with when the dividing plane 322 satisfies the above-described configuration (1). This is because when the dividing plane 322 is parallel to the resin filing direction, the core pieces 321 are easily caused to behave in a direction in which they are separated from each other, as compared with when the dividing plane 322 is nonparallel to the resin filling direction. That is, the cracking of the outer core portions 32 is easily inhibited.

As the above-described configuration (2), one of the following configurations (2-1) to (2-3) can be adopted, for example.

(2-1) The dividing plane 322 includes a surface that non-orthogonally intersects the vertical direction of the outer core portion 32. That is, the dividing plane 322 includes a surface that non-orthogonally intersects the vertical direction of the outer core portion 32, and that is parallel to the inward-outward direction of the outer core portion 32. The dividing plane 322 is a surface that intersects the magnetic flux in the outer core portion 32.

(2-2) The dividing plane 322 includes a surface orthogonal to the vertical direction of the outer core portion 32. The orthogonal surface is a surface parallel to the inward-outward direction of the outer core portion 32. That is, the dividing plane 322 is a surface parallel to the magnetic flux in the outer core portion 32.

(2-3) The dividing plane 322 includes a surface that non-orthogonally intersects the vertical direction of the outer core portion 32, and a surface orthogonal to the vertical direction of the outer core portion 32. That is, the dividing plane 322 includes a surface that non-orthogonally intersects the vertical direction of the outer core portion 32, and that is parallel to the inward-outward direction of the outer core portion 32, and a surface orthogonal to the vertical direction of the outer core portion 32.

Preferably, the dividing plane 322 satisfies the above-described configuration (2-2). This is because, as compared with when the dividing plane 322 satisfies the above-described configuration (2-1) or (2-3), the constituent resin of the inner resin portion 5 is likely to sufficiently fill in a gap between each of the winding portions 21 and 22 and the corresponding inner core portion 31 even when the gap is small. Even when the above-described filling pressure and the above-described holding pressure at the time of forming the inner resin portion 5 are increased, the load acting on the outer core portion 32 due to, for example, contact with the constituent resin of the inner resin portion 5 at the time of filling is easily reduced as compared with when the dividing plane 322 satisfies the above-described configuration (2-1) or (2-3). That is, the cracking of the outer core portion 32 is easily reduced.

In the case of adopting the above-described configuration (2-1), examples of the longitudinal cross-sectional shape of the dividing plane 322 include a polygonal line shape, a curved shape, and an inclined shape. Examples of the polygonal line shape include a V-shape, an N-shape, and a W-shape. Examples of the curved shape include an arc shape, an S-shape, and a sine wave shape. The longitudinal cross-sectional shape of the dividing plane 322 refers to a shape represented by an edge of the dividing plane 322 on a second cut surface of the outer core portion 32. The second cut surface of the outer core portion 32 refers to a surface parallel both to the vertical direction of the outer core portion 32 and to the direction of the magnetic flux in the outer core portion 32 (the parallel arrangement direction of the pair of winding portions 21 and 22). In particular, when the longitudinal cross-sectional shape of the dividing plane 322 is a V-shape, an N-shape, a W-shaped, or a curved shape, the core pieces 321 can be fitted to each other in the vertical direction via a recess and a protrusion defined by the dividing plane 322. Accordingly, the positioning between the core pieces 321 is facilitated. On the second cut surface of the outer core portion 32, end portions of the dividing plane 322 may intersect left and right sides of the outer core portion 32, or may intersect either an upper side, a lower side, upper corners, or lower corners of the outer core portion 32.

In the case of adopting the above-described configuration (2-2), examples of the longitudinal cross-sectional shape of the dividing plane 322 include a planar shape. In this case, good magnetic properties are achieved because the dividing plane 322 does not intersect the magnetic path, but is parallel thereto.

In the case of adopting the above-described configuration (2-3), examples of the combination of the dividing plane 322 include the following. The outer core portion 32 is divided into three parts in the magnetic path direction, thus dividing the dividing plane 322 into a central dividing plane 323, a left-side dividing plane 324, and a right-side dividing plane 325. The central dividing plane 323 is constituted by a surface that non-orthogonally intersects the vertical direction of the outer core portion 32, and that is parallel to the inward-outward direction of the outer core portion 32, for example, a V-shaped surface. The left-side dividing plane 324 and the right-side dividing plane 325 are each constituted by a surface orthogonal to the vertical direction of the outer core portion 32. Alternatively, the left-side dividing plane 324 and the right-side dividing plane 325 are each constituted by a surface that non-orthogonally intersects the vertical direction of the outer core portion 32, and that is parallel to the inward-outward direction of the outer core portion 32, for example, an inclined surface. The central dividing plane 323 is constituted by a surface orthogonal to the vertical direction of the outer core portion 32.

The dividing plane 322 in the present example adopts the above-described configuration (2-2). That is, the dividing plane 322 is constituted by a surface orthogonal to the vertical direction of the outer core portion 32. The longitudinal cross-sectional shape of the dividing plane 322 is a planar shape.

When the outer core portion 32 includes hole portions 35, which will be described below, as in the case of the present example, the position in the vertical direction at which the dividing plane 322 is formed is preferably a position at which the hole portions 35 are divided. A large tensile stress acts on the outer core portion 32 as a result of the resin that has been filled in the hole portions 35 forcing the inner circumferential surfaces of the hole portions 35 to expand outward. However, because the dividing plane 322 divides the hole portions 35, the core pieces 321 can behave independently, and it is thus possible to reduce the force acting to expand the inner circumferential surfaces of the hole portions 35. That is, it is possible to reduce the tensile stress acting on the outer core portion 32. Accordingly, damage to the outer core portion 32 resulting from the filling of the constituent resin at the time of forming the inner resin portion 5 is easily inhibited. In the present example, the position in the vertical direction at which the dividing plane 322 is formed is a position at which the center of the hole portion 35 in the vertical direction is divided.

The dividing plane 322 includes a central dividing plane 323 provided between the hole portions 35, and a left-side dividing plane 324 and a right-side dividing plane 325 that are provided outward of the hole portions 35. In the present example, the central dividing plane 323, the left-side dividing plane 324, and the right-side dividing plane 325 are located on the same plane. Note that, although this will be described in Embodiment 2 below, at least one of the central dividing plane 323, the left-side dividing plane 324, and the right-side dividing plane 325 may be located on a plane different from the other dividing planes.

Hole Portion

The outer core portion 32 includes hole portions 35 extending therethrough in the inward-outward direction of the outer core portion 32. That is, the openings of each hole portion 35 are formed in an outer side surface and an inner side surface of the outer core portion 32. The hole portions 35 serve as filling paths for filling the constituent resin of the inner resin portion 5 into the winding portions 21 and 22 at the time of forming the inner resin portion 5. The number of hole portions 35 can be selected as appropriate, and may be one, or more than one. The number of hole portions 35 in the present example is two.

The opening on the inner side of each of the hole portions 35 is open at a position facing a gap h1 (FIG. 4) between the inner circumferential surface of each of the winding portion 21 and 22 and the outer circumferential surface of the corresponding inner core portion 31. The gap h1 is a gap that constitutes a part of a tubular space between the inner circumferential surface of each of the winding portions 21 and 22 and the outer circumferential surface of the corresponding inner core portion 31, the gap being located between a portion of the inner circumferential surface of each of the winding portions 21 and 22 that is located toward the center in the parallel arrangement direction of the winding portions 21 and 22, and the inner core portion 31 disposed inside each of the winding portions 21 and 22. Because the opening on the inner side of each of the hole portions 35 is open in the gap h1, the constituent resin of the inner resin portion 5 can be reliably filled inside the winding portions 21 and 22 at the time of forming the inner resin portion 5.

The size of each of the hole portions 35 can be selected as appropriate such that the magnetic path of the outer core portion 32 will not be excessively narrowed. For example, the length of each of the hole portions 35 along the vertical direction of the outer core portion 32 is preferably 10% or more and 50% or less of the length (height) of the outer core portion 32 in the vertical direction. When the above-described length of each of the hole portions 35 is 10% or more of the height of the outer core portion 32, the hole portions 35 are easily used as filling paths of the constituent resin of the inner resin portion 5. When the above-described length of each of the hole portions 35 is 50% or less of the height of the outer core portion 32, the magnetic path of the outer core portion 32 will not be excessively narrowed. The lower limit of the above-described length of each of the hole portions 35 can be 20% or more, or even 25% or more of the height of the outer core portion 32. The upper limit of the above-described length of each of the hole portions 35 can be 40% or less, or even 30% or less of the height of the outer core portion 32. On the other hand, the length (width) of each of the hole portions 35 along the magnetic path direction affects the magnetic properties and the strength of the outer core portion 32. Accordingly, the above-described length (width) of each of the hole portions 35 can be selected as appropriate such that the magnetic properties and the strength of the outer core portion 32 will not be reduced.

Preferably, an edge portion of the opening on the outer side of each of the hole portions 35 is chamfered. Chamfering the above-described edge portion allows a resin to readily flow into the two hole portions 35 when filling the resin into the winding portions 21 and 22 via the two hole portions 35 from the outer side of the outer core portion 32. Examples of the chamfering include R-chamfering and C-chamfering.

Inner Core Portion

Preferably, the shape of each of the inner core portions 31 is a shape conforming to the shape of the inner circumferences of the winding portions 21 and 22. The shape of the inner core portion 31 in the present example is a rectangular parallelepiped shape. The corners of the inner core portion 31 are rounded so as to extend along the inner circumferential surfaces of the winding portions 21 and 22.

Each of the inner core portions 31 includes a plurality of columnar core pieces 311 (FIG. 2). It is assumed that a direction of the inner core portion 31 that extends along the vertical direction of the outer core portion 32 is the vertical direction. It is assumed that a direction orthogonal both to the vertical direction of the inner core portion 31 and to the direction of the magnetic flux in the inner core portion 31 is the horizontal direction. It is assumed that the direction of the magnetic flux in the inner core portion 31 is a direction extending along the axial direction of the winding portions 21 and 22. The plurality of core pieces 311 are coupled via a dividing plane that intersects the direction of the magnetic flux in the inner core portion 31, and that passes through the inner core portion 31 from the upper surface to the lower surface thereof (from the left side surface to the right side surface). That is, the dividing plane divides the inner core portion 31 in the direction of the magnetic flux.

The number of core pieces 311 of each of the inner core portions 31 can be selected as appropriate. The number of core pieces 311 in the present example is three. The number of the above-described dividing planes is two. Each dividing plane in the present example is orthogonal to the magnetic flux in the inner core portion 31. That is, the shapes of the core pieces 311 are prismatic shapes that are identical to each other.

The adjacent core pieces 311 are not coupled directly, but are coupled via a gap 312. In addition, the core pieces 311 and each of the outer core portion 32 are not coupled directly, but are coupled via a gap 313. That is, each of the inner core portions 31 is formed by a stack in which the core pieces 311 and the gaps 312 and 313 are stacked along the axial direction of the coil 2 (the direction of the magnetic flux in the inner core portion 31). Each core piece 311 is formed of a powder compact or a composite material. The materials of the core pieces 311 and the gaps 312 and 313 will be described later.

Each of the inner core portions 31 does not have a dividing plane passing therethrough from a surface thereof on one end side to a surface thereof on the other end side in the direction extending along the magnetic flux in the inner core portion 31. In the present example, the surface on one end side and the surface on the other end side in the direction extending along the magnetic flux in the inner core portion 31 are surfaces orthogonal to the magnetic flux. That is, the dividing plane is a surface that divides the inner core portion 31 in the vertical direction or the horizontal direction. "The inner core portion 31 does not have this dividing plane" means that the inner core portion 31 is not divided in either the vertical direction or the horizontal direction. That is, the inner core portion 31 does not include a plurality of core pieces that are divided in the vertical direction and the horizontal direction. Because the inner core portion 31 does not have the above-described dividing plane, it is possible to suppress the reduction in the magnetic properties. This is because the inner core portion 31 will not be displaced in the above-described inward-outward direction upon contact with the constituent resin of the inner resin portion 5 at the time of forming the inner resin portion 5.

Note that each of the inner core portions 31 may be formed by one columnar core piece having any of the above-described dividing planes. This core piece has no gap interposed therein, and has substantially the entire length of the axial direction of the winding portions 21 and 22.

Inner Resin Portion

As shown in FIG. 2, the inner resin portion 5 joins the inner circumferential surface of the winding portion 22 and the outer circumferential surface of the corresponding inner core portion 31 (core pieces 311). Although not shown, the same configuration is adopted on the winding portion 21 (FIG. 1) side. The inner resin portion 5 is interposed in a tubular space located between the inner circumferential surface of each of the winding portions 21 and 22 and the outer circumferential surface of the corresponding inner core portion 31. The inner resin portion 5 is formed in substantially the entire region of the tubular space.

The inner resin portion 5 in the present example remains in the winding portions 21 and 22, and has not overflowed from the space between the turns to the outer circumferences of the winding portions 21 and 22. When the adjacent turns of each of the winding portions 21 and 22 are in contact with each other as in the case of the present example, it is possible to make a part of the inner resin portion 5 less likely to overflow from the space between the turns to the outer circumference of each of the winding portions 21 and 22. Note that a part of the inner resin portion 5 is less likely overflow also in the case where the adjacent turns are not in contact with each other and the interval between the adjacent turns is sufficiently small, or where each of the winding portions 21 and 22 includes an integration resin, which will be described later. A part of the inner resin portion 5 in the present example enters the spaces between the core pieces 311 of each of the inner core portions 31, and the space between the core pieces 311 and each of the outer core portions 32, thus forming the gaps 312 and 313.

A large void is hardly formed inside the inner resin portion 5, and, moreover, a small void is hardly formed thereinside. The reason is that because each of the outer core portions 32 has the dividing plane 322, the above-described filling pressure and the above-described holding pressure at the time of forming the inner resin portion 5 can be increased as described above. Accordingly, the resin can be sufficiently filled inside the winding portions 21 and 22. Thus, a large void is less likely to be formed in the inner resin portion 5 formed inside the winding portions 21 and 22. The inner resin portion 5 with fewer voids is excellent in strength. Accordingly, the inner resin portion 5 is less likely to be damaged by vibrations generated when the reactor 1 is used. Thus, the operation of the reactor 1 is stabilized.

As the material of the inner resin portion 5, it is possible to use, for example, a thermosetting resin or a thermoplastic resin. Examples of the thermosetting resin include an epoxy resin, a phenol resin, a silicone resin, and a urethane resin. Examples of the thermoplastic resin include a polyphenylene sulfide (PPS) resin, a polyamide (PA) resin (e.g., nylon 6, nylon 66, nylon 9T, etc.), a liquid crystal polymer (LCP), a polyimide resin, and a fluororesin. These resins may contain a ceramic filler. Examples of the ceramic filler include alumina and silica. The inner resin portion 5 containing a ceramic filler can enhance the heat dissipation of the inner resin portion 5.

Operation and Effects of Main Feature Portions of Reactor

The reactor 1 according to Embodiment 1 can achieve the following effects.

(1) The constituent resin of the inner resin portion 5 can be sufficiently filled in a gap between each of the winding portions 21 and 22 and the corresponding inner core portion 31 even when the gap is small. This is because the above-described filling pressure and the above-described holding pressure at the time of forming the inner resin portion 5 can be increased. Even when the above-described filling pressure and the above-described holding pressure are increased, the load acting on the outer core portion 32 due to, for example, contact with the constituent resin of the inner resin portion 5 at the time of filling can be reduced because each of the outer core portions 32 has the dividing plane 322 orthogonal to the vertical direction. In particular, because the dividing plane 322 divides the hole portions 35 in the vertical direction, the tensile stress acting on the outer core portion 32 as a result of the constituent resin of the inner resin portion 5 filled in the hole portions 35 forcing the inner surfaces of the hole portions 35 to expand outward is easily reduced. Accordingly, it is possible to inhibit the outer core portion 32 from cracking so as to be divided in the vertical direction.

(2) The gap between each of the winding portion 21 and 22 and the corresponding inner core portion 31 can be reduced. This is because, as in the case of (1) above, the constituent resin of the inner resin portion 5 can be sufficiently filled in a gap between each of the winding portions 21 and 22 and the corresponding inner core portion 31 even when the gap is small. Accordingly, the size of the coil 2 can be reduced by making the size of the inner core portions 31 constant, and it is thus possible to miniaturize the reactor 1. Alternatively, the magnetic path area of the inner core portion 31 can be increased by making the size of the coil 2 constant, and it is thus possible to enhance the magnetic properties thereof.

Descriptions of Configurations Including the Other Feature Portions Coil

As the winding wires 211 and 221 constituting the winding portions 21 and 22 of the coil 2, it is possible to use a coated wire including an insulating coating around the outer circumference of a conductor wire. Examples of the material of the conductor wire include copper, aluminum, and magnesium, or alloys thereof. Examples of the type of the conductor wire include a flat rectangular wire and a round wire. Examples of the insulating coating include enamel (typically, polyamide imide). As the winding wires 211 and 221 in the present example, a coated flat rectangular wire is used that includes a conductor wire formed by a flat rectangular wire made of copper, and an insulating coating made of enamel (typically, polyamide imide). An edgewise coil formed by winding this coated flat rectangular wire in an edgewise manner is used to form each of the winding portions 21 and 22.

Both end portions 215 and 225 of each of the winding wires 211 and 221 are extended upward at both ends of the coil 2 in the axial direction. The insulating coating is stripped off at both end portions 215 and 225 of each of the winding wires 211 and 221, thus exposing the conductors. The conductors at the end portions 215 and 225 on one end side (the right side on the plane of the paper in FIG. 1) of the coil 2 in the axial direction are directly connected to each other. Specifically, the end portion 225 side of the winding wire 221 of the winding portion 22 is bent, and is extended and connected to the end portion 215 side of the winding wire 211 of the winding portion 21. Note that the connection between the conductors may be achieved via a connecting member independent of the pair of winding portions 21 and 22. The coupling member is formed by the same member as the winding wires 211 and 221, for example. This connection can be achieved by welding or pressure contact. On the other hand, a terminal member (not shown) is connected to the conductors at the end portions 215 and 225 on the other end side (the left side on the plane of the paper in FIG. 1) of the coil 2 in the axial direction. An external device (not shown) such as a power supply that supplies power to the coil 2 is connected to the coil 2 via this terminal member.

The winding portions 21 and 22 may be separately integrated using an integration resin (not shown). The integration resin covers the outer circumferential surface, the inner circumferential surface, and the end faces of each of the winding portions 21 and 22, and joins the adjacent turns to each other. The integration resin can be formed by using winding wires 211 and 221 each including a thermally fusible resin coating layer formed on the outer circumference thereof (a further outer circumference of the insulating coating), winding the winding wires 211 and 221, and thereafter melting the coating layer by heating. Examples of the type of the thermally fusible resin include thermosetting resins such as an epoxy resin, a silicone resin, an unsaturated polyester.

Note that the pair of winding portions 21 and 22 included in the coil 2 can also be formed by one winding wire. The shape of the winding portions 21 and 22 may be a cylindrical shape. The cylindrical shape means that the end face shape of the winding portions 21 and 22 is an elliptic shape, a perfect circular shape, a racetrack shape, or the like.

Magnetic Core

Material

The core pieces 311 of the inner core portions 31 and the core pieces 321 of the outer core portions 32 are each made of a powder compact or a composite material. The powder compact is formed by compression molding soft magnetic powder. For the powder compact, the proportion of the soft magnetic powder in the core pieces can be higher than for the composite material. Therefore, the magnetic properties (the relative permeability and the saturation flux density) of the powder compact are easily enhanced. The composite material is formed by dispersing soft magnetic powder in a resin. The composite material can be obtained by filling a mold with a flowable material obtained by dispersing soft magnetic powder in an unsolidified resin, and curing the resin. For the composite material, the content of the soft magnetic powder in the resin can be easily adjusted. Therefore, the magnetic properties (the relative permeability and the saturation flux density) of the composite material are easily adjusted. Moreover, the composite material is more easily formed even in a complex shape, as compared with the powder compact. Note that the core pieces 311 and 321 can each be formed as a hybrid core in which the outer circumference of the powder compact is covered with the composite material.

Examples of the particles constituting the soft magnetic powder include particles of a soft magnetic metal, coated particles including an insulating coating on the outer circumference of particles of a soft magnetic metal, and particles of a soft magnetic nonmetal. Examples of the soft magnetic metal include pure iron and iron-based alloys (Fe—Si alloy, Fe—Ni alloy, etc.). Examples of the insulating coating include phosphates. Examples of the soft magnetic nonmetal include ferrite. Examples of the resin used for the composite material include resins similar to the resin used for the inner resin portion 5 described above. The gaps 312 and 313 are each made of a material having a relative permeability smaller than that of the core piece 311. The gaps 312 and 313 in the present example are formed by the inner resin portion 5.

Intermediate Resin Portion

The reactor 1 may include an intermediate resin portion 6 (FIG. 2). The intermediate resin portion 6 is filled into the hole portions 35 of the outer core portion 32. The intermediate resin portion 6 can seal the inside of the hole portions 35. Therefore, the intermediate resin portion 6 easily prevents water droplets or the like from entering the space between the coil 2 and each of the inner core portions 31 through the hole portions 35. The intermediate resin portion 6 is coupled to the inner resin portion 5. The intermediate resin portion 6 is formed by a part of the inner resin portion 5 being filled into the hole portions 35 at the time of forming the inner resin portion 5 when the hole portions 35 are used as the filling paths of the inner resin portion 5. That is, the intermediate resin portion 6 and the inner resin portion 5 are formed at once using the same resin.

Outer Resin Portion

The reactor 1 may include an outer resin portion 7. The outer resin portion 7 protects the outer core portion 32 from an external environment (FIGS. 1, 2). In the present example, the outer resin portion 7 covers a region of the outer circumferential surface of each of the outer core portions 32 other than the surface coupled to the inner core portions 31.

Note that the lower surface of the outer core portion 32 may be exposed from the outer resin portion 7. In that case, when the lower surface of the outer core portion 32 is caused to protrude below the lower surface of the coil 2, or when the reactor 1 includes an end face member 41, which will be described later, it is preferable that the lower surface of the outer core portion 32 is caused to protrude so as to be substantially flush with the lower surface of the end face member 41. By bringing the lower surface of the outer core portion 32 into direct contact with an installation target surface of the reactor 1, it is possible to increase the heat dissipation of the magnetic core 3 including the outer core portion 32. Alternatively, by interposing an adhesive or a heat dissipation sheet between the lower surface of the outer core portion 32 and the installation target surface of the reactor 1, it is possible to increase the heat dissipation of the magnetic core 3 including the outer core portion 32. When an end face member 41, which will be described later, is provided as in the case of the present example, the outer resin portion 7 can fix each of the outer core portions 32 to the end face member 41.

As shown in FIG. 2, the outer resin portion 7 is coupled to the inner resin portion 5 via the intermediate resin portion 6 in the hole portions 35 of the outer core portion 32. The outer resin portion 7 can be formed by concurrently covering the outer circumference of the outer core portion 32 with the constituent resin of the inner resin portion 5 at the time of forming the inner resin portion 5. In that case, the outer resin portion 7, the intermediate resin portion 6, and the inner resin portion 5 are formed at once using the same resin. Note that the outer resin portion 7 can also be formed separately from the inner resin portion 5.

In addition, a fixing portion 71 may be formed on the outer resin portion 7 (FIG. 1). The fixing portion 71 fixes the reactor 1 to an installation target surface (e.g., the bottom surface of a case). The fixing portion 71 is formed as a single piece with the outer resin portion 7 using the constituent material of the outer resin portion 7. The location where the fixing portion 71 is formed can be selected as appropriate according to the attachment location of an installation target of the reactor 1. The fixing portion 71 in the present example is provided in the form of a flange so as to bulge from the outer end face of the outer resin portion 7 in the parallel arrangement direction of the coil 2. A collar formed of a metal or a resin having high rigidity is embedded in the fixing portion 71. With the collar, the creep deformation caused by a fastening member (e.g., a bolt) for fixing the reactor 1 to the installation target surface is easily inhibited. An insertion hole for the fastening member is formed in the collar.

Interposed Member

The combined body 10 may include an interposed member 4 (FIGS. 1 to 4). The interposed member 4 ensures the insulation between the coil 2 and the magnetic core 3. The interposed member 4 in the present example includes a pair of end face members 41 and the number of inner members 42 corresponding to the number of the inner core portions 31.

End Face Member

The end face member 41 ensures the insulation between each of the end faces of the coil 2 and the corresponding outer core portion 32. The shapes of the end face members 41 are the same. Each of the end face members 41 is a frame-shaped plate material having two through holes 410 provided along the parallel arrangement direction of the winding portions 21 and 22. An assembly of an inner core portion 31 (core piece 311) and an inner member 42 is fitted into each of the through holes 410.

An assembly in which the outer core portion 32 is fitted into a recess 412 (described later) of the end face member 41 is viewed from the outer side of the outer core portion 32 (FIG. 4). At this time, a gap h3 exposed from the outer core portion 32 is formed on the upper side and the outer side of each of the through holes 410 (see also FIG. 2). The gap h3 is in communication with a gap h2 (FIG. 2) formed between the inner circumferential surface of a coupling portion 432 of an end piece 43, which will be described later, and the outer circumferential surface of the inner core portion 31 (core piece 311). That is, the gap h3 is in communication with a space between the inner circumferential surface of each of the winding portions 21 and 22 and the outer circumferential surface of the corresponding inner core portion 31 (core piece 311). The gap h3 can be used as a filling path of the inner resin portion 5.

Two recesses 411 for housing end faces of the winding portions 21 and 22 are formed in a surface on the coil 2 side of each of the end face members 41 (see the right side on the plane of paper in FIG. 3). The recesses 411 on the coil 2 side bring the entire end faces of the winding portions 21 and 22 into surface contact with the end face member 41. Each of the recesses 411 is formed in a rectangular ring shape so as to surround the through hole 410. The right side portion of each of the recesses 411 reaches the upper end of the end face member 41, thus allowing the end portions 215 and 225 of the winding portions 21 and 22 to be pulled out upward. One recess 412 for fitting the outer core portion 32 therein is formed in a surface of each of the end face members 41 on the outer core portion 32 (see the left side on the plane of paper in FIG. 3).

Inner Member

The inner member 42 ensures the insulation between the outer circumferential surface of each of the inner core portions 31 and the inner circumferential surface of the winding portion 21 or 22 (FIG. 3). The inner members 42 have the same configuration. The inner members 42 in the present example include a pair of end pieces 43 for each inner core portion 31, and a plurality of (two in the present example) intermediate pieces 44 for each inner core portion 31.

The end pieces 43 are interposed between the outer core portions 32 and the core pieces 311. Each of the end pieces 43 is a rectangular frame-shaped member. Each of the end pieces 43 includes abutting stopper portions 431 and coupling portions 432. The abutting stopper portions 431 abut against and stop the core piece 311, thus forming a separation portion having a predetermined length between the core piece 311 and the outer core portion 32. The abutting stopper portions 431 are provided at four corners of each end piece 43. The width of each abutting stopper portion 431 in the axial direction of the inner core portion 31 is wider than the width of each coupling portion 432. The coupling portions 432 couple the abutting stopper portions 431 to each other. The outer circumferential surface of each of the coupling portions 432 is in contact with the inner circumferential surface of the winding portion 21 or 22. The inner circumferential surface of each of the coupling portions 432 is not in contact with the outer circumferential surface of a core piece 311, thus forming gaps h1 and h2 between the core piece 311 and the coupling portion 432 (FIGS. 2, 4). The gaps h1 and h2 serve as filling paths of the inner resin portion 5.

The intermediate piece 44 is interposed between adjacent core pieces 311. Each of the intermediate pieces 44 is a generally U-shaped member. Each of the intermediate pieces 44 is provided with an abutting stopper portion 441 (see FIG. 2) for abutting against and stopping the core piece 311. The abutting stopper portion 441 forms a separation portion having a predetermined length between adjacent core pieces 311.

The inner resin portion 5 enters the separation portions. The inner resin portion 5 that has entered the separation portions forms gaps 312 and 313 (see FIG. 2).

Material

Examples of the material of the interposed member 4 (the end face members 41 and the inner members 42) include insulating materials such as various resins. Examples of the resins include resins similar to those used for the inner resin portion 5 described above. Examples of other thermoplastic resins include a polytetrafluoroethylene (PTFE) resin, a polybutylene terephthalate (PBT) resin, and an acrylonitrile-butadiene-styrene (ABS) resin. Examples of other thermosetting resins include an unsaturated polyester resin. In particular, the material of the interposed member 4 is preferably the same material as that of the inner resin portion 5. This is because the interposed member 4 and the inner resin portion 5 can have the same coefficient of linear expansion, thus making it possible to inhibit damage due to thermal expansion/contraction of the members.

Usage Modes

The reactor 1 can be used as a constituent member of a power conversion device such as a bidirectional DC/DC converter that is mounted in electric vehicles such as a hybrid automobile, an electric automobile, and a fuel cell automobile.

The reactor 1 in the present example can be used in a state of being immersed in a liquid refrigerant. Examples of the type of the liquid refrigerant include, but are not particularly limited to, ATF (Automatic Transmission Fluid) in the case of using the reactor 1 in a hybrid automobile. Other usable examples of the liquid refrigerant include a fluorine-based inert liquid, a chlorofluorocarbon-based refrigerant, an alcohol-based refrigerant, and a ketone-based refrigerant. Examples of the fluorine-based inert liquid include Fluorinert (registered trademark). Examples of the chlorofluorocarbon-based refrigerant include HCFC-123 and HFC-134a. Examples of the alcohol-based refrigerant include methanol and alcohol. Examples of the ketone-based refrigerant include acetone. In the reactor 1 in the present example, the winding portions 21 and 22 are exposed to the outside. Accordingly, in the case of cooling the reactor 1 using a cooling medium such as a liquid refrigerant, the winding portions 21 and 22 can be brought into direct contact with the cooling medium. Therefore, the reactor 1 in the present example is excellent in heat dissipation.

Production Method of Reactor

A reactor 1 can be produced by providing a combined body 10 formed by combining a coil 2, core pieces 311 and 321, and an interposed member 4, then filling a resin between the winding portions 21 and 22 and the core pieces 311, and curing the resin.

In the present example, injection molding is performed in which an assembly is disposed inside a molding mold (not shown), and a resin is injected into the molding mold. The resin is injected from two injection holes of the molding mold. The injection holes are provided at positions corresponding to the two hole portions 35 of each of the outer core portions 32. That is, the injection of the resin is performed by two-side filling in which the resin is filled from the outer side (the side opposite to the coil 2) of each of the outer core portions 32. The resin that has been filled in the molding mold covers the outer circumferences of the outer core portions 32, and flows into the winding portions 21 and 22 via the hole portions 35 of the outer core portions 32. In addition, the resin flows around the outer circumferential surfaces of the outer core portions 32, and enters the inside of the winding portions 21 and 22 via the gaps h3 (filling paths) of the end face members 41.

The resin that has been filled into the winding portions 21 and 22 enters not only the spaces between the inner circumferential surfaces of the winding portions 21 and 22 and the outer circumferential surfaces of the core pieces 311, but also the spaces between adjacent core pieces 311, and the spaces between the core pieces 311 and the outer core portions 32. The resin that has entered the spaces between the adjacent core pieces 311, and the spaces between the core pieces 311 and the outer core portions 32 forms gaps 312 and 313. The resin that has been filled in the winding portions 21 and 22 by being pressurized by injection molding sufficiently spreads in the narrow gaps between the winding portions 21 and 22 and the inner core portions 31. However, the resin hardly leaks to the outside of the winding portions 21 and 22. This is because the adjacent turns of each of the winding portions 21 and 22 are in contact with each other.

Once the resin has been filled into the winding portions 21 and 22, the resin is cured by heat treatment or the like. Of the cured resin, the resin inside the winding portions 21 and 22 constitutes an inner resin portion 5 as shown in FIG. 2. The resin inside the hole portions 35 of the outer core portions 32 constitutes an intermediate resin portion 6. Also, the resin that covers the outer core portions 32 constitutes an outer resin portion 7.

Embodiment 2

Reactor

Figure 5:
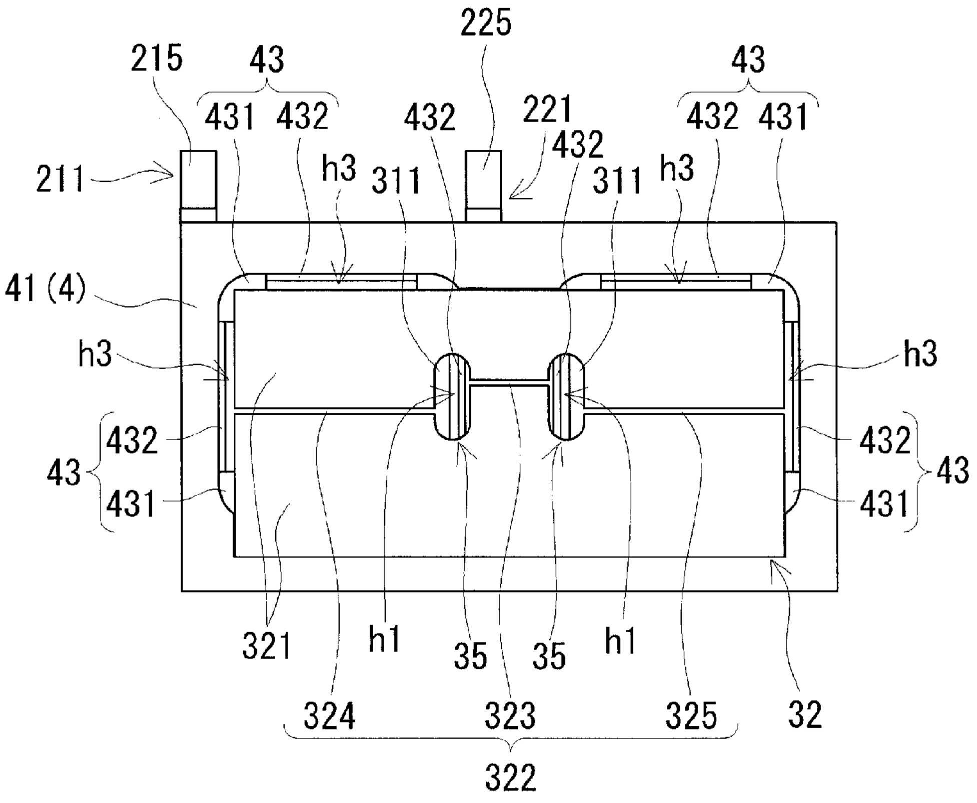
FIG. 5 is a front view schematically showing a combined body included in a reactor according to Embodiment 2, as viewed from the outer side of an outer core portion.

A reactor according to Embodiment 2 will be described with reference to FIG. 5. The reactor according to Embodiment 2 is different in that, of the dividing plane 322 of the outer core portion 32, at least one of the central dividing plane 323, the left-side dividing plane 324, and the right-side dividing plane 325 is located on a different plane from the other dividing planes. The following description is focused on the difference. The descriptions of the same configurations have been omitted. These also apply to Embodiments 3 to 6, which will be described later.

In the present example, the central dividing plane 323, the left-side dividing plane 324, and the right-side dividing plane 325 are all constituted by a surface orthogonal to the vertical direction of the outer core portion 32. The position in the vertical direction at which the central dividing plane 323, the left-side dividing plane 324, and the right-side dividing plane 325 are formed is located at a position at which the hole portions 35 are divided in the vertical direction of the outer core portion 32. The central dividing plane 323 is located on a different plane from the left-side dividing plane 324 and the right-side dividing plane 325. The left-side dividing plane 324 and the right-side dividing plane 325 are located on the same plane. The central dividing plane 323 is located above the left-side dividing plane 324 and the right-side dividing plane 325. Specifically, the central dividing plane 323 is formed on the upper side of the center of the hole portions 35 in the vertical direction. The left-side dividing plane 324 and the right-side dividing plane 325 are formed on the lower side of the center of the hole portions 35 in the vertical direction. Note that the central dividing plane 323 may be located below the left-side dividing plane 324 and the right-side dividing plane 325. All of the central dividing plane 323, the left-side dividing plane 324, and the right-side dividing plane 325 may be located on different planes.

Operation and Effects

As in the case of Embodiment 1, the reactor according to Embodiment 2 allows the constituent resin of the inner resin portion 5 to sufficiently fill in a gap between each of the winding portions 21 and 22 and the corresponding inner core portion 31 even when the gap is small. Moreover, the reactor according to the present embodiment is excellent in manufacturability. The reason is as follows. Because the left-side dividing plane 324 and the right-side dividing plane 325 are located on a different plane from the central dividing plane 323, the upper and lower core pieces 321 are easily fitted via a recess and a protrusion defined by the dividing plane 322. Accordingly, the reactor according to the present embodiment facilitates the positioning between the upper and lower core pieces 321 of each of the outer core portions 32.

Embodiment 3

Reactor

Figure 6:
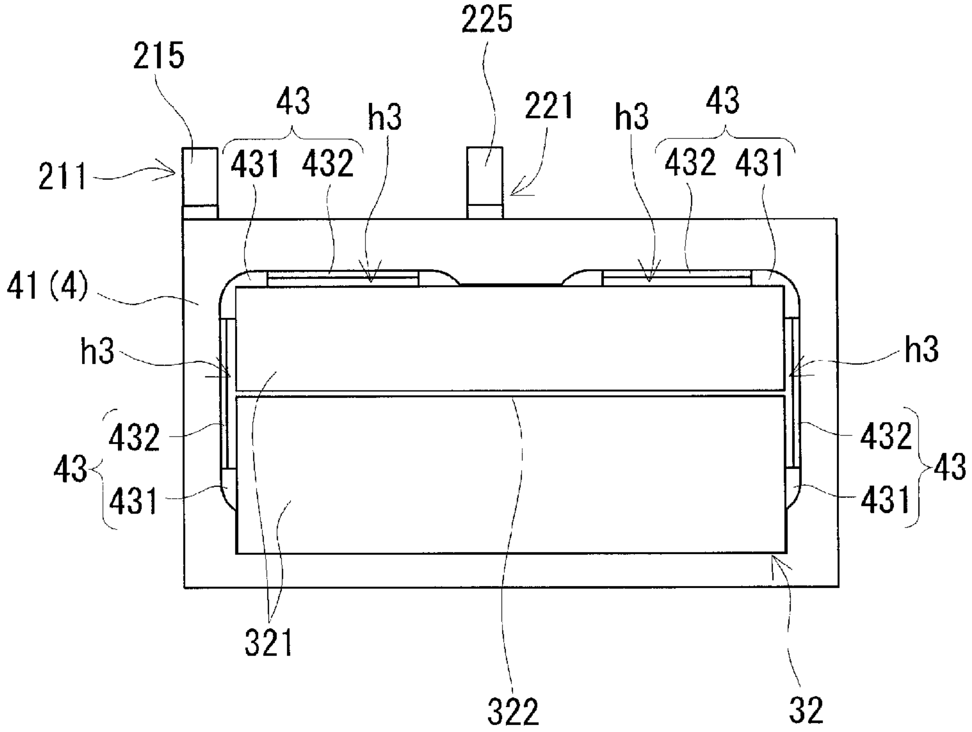
FIG. 6 is a front view schematically showing a combined body included in a reactor according to Embodiment 3, as viewed from the outer side of an outer core portion.

A reactor according to Embodiment 3 will be described with reference to FIG. 6. The reactor according to Embodiment 3 is different from Embodiment 1 in that the outer core portion 32 does not include the hole portions 35 (FIGS. 1 to 4).

As in the case of Embodiment 1, the dividing plane 322 of the outer core portion 32 is constituted only by a surface orthogonal to the vertical direction. The longitudinal cross-sectional shape of the dividing plane 322 is a planar shape. The dividing plane 322 is located on the same plane. When the outer core portion 32 does not include the hole portions 35 as in the case of the present example, examples of the position in the vertical direction at which the dividing plane 322 is formed include a region extending downward up to 20% of the length of the outer core portion 32 in the vertical direction from the center of the outer core portion 32 in the vertical direction, and a region extending upward up to 20% of the aforementioned length from the aforementioned center. That is, the position may be in, for example, a region that constitutes 40% of the outer core portion 32 in the vertical direction and that includes the center of the outer core portion 32 in the vertical direction. In the present example, the entirety of the dividing plane 322 is included within this region.

Operation and Effects

As in the case of Embodiment 1, the reactor according to Embodiment 3 allows the constituent resin of the inner resin portion 5 to sufficiently fill in a gap between each of the winding portions 21 and 22 and the corresponding inner core portion 31 even when the gap is small. Even when the outer core portion 32 does not include the hole portions 35, the outer core portion 32 may crack at the time of forming the inner resin portion 5. This is because a large bending stress may act on the outer core portion 32 due to contact with the constituent resin of the inner resin portion 5. However, because the outer core portion 32 has the dividing plane 322, the load acting on the outer core portion 32 at the time of forming the inner resin portion 5 can be reduced. Accordingly, the above-described filling pressure and the holding pressure at the time of forming the inner resin portion 5 can be increased.

Embodiment 4

Reactor

Figure 7:
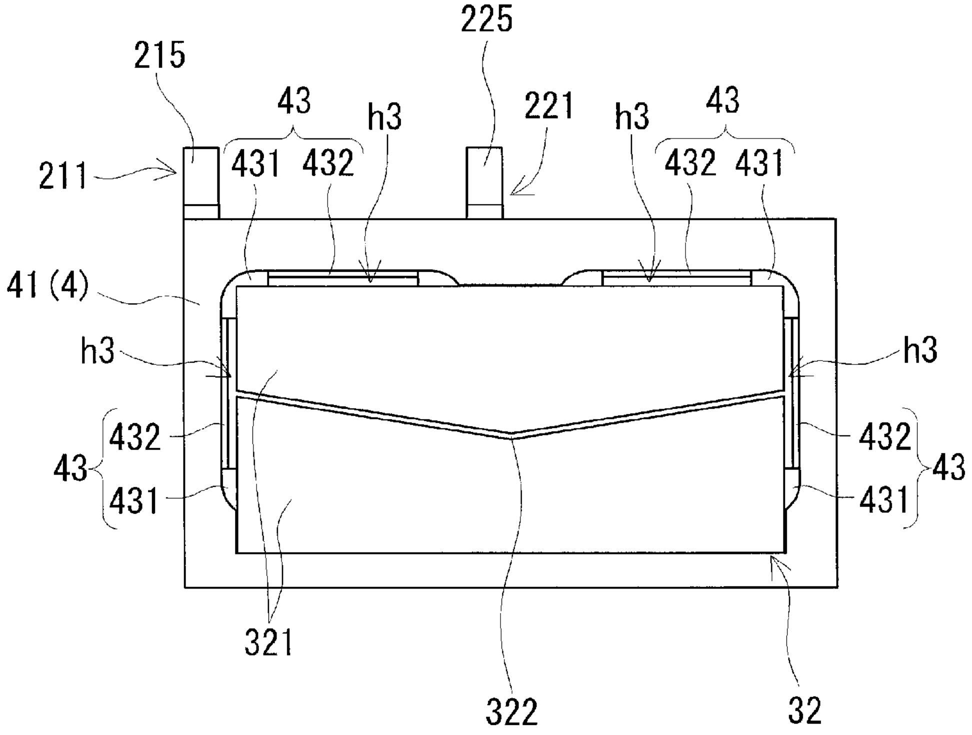
FIG. 7 is a front view schematically showing a combined body included in a reactor according to Embodiment 4, as viewed from the outer side of an outer core portion.

A reactor according to Embodiment 4 will be described with reference to FIG. 7. The reactor according to Embodiment 4 is different from Embodiment 1 in that the outer core portion 32 does not include the hole portions 35 (FIGS. 1 to 4), and with regard to the longitudinal cross-sectional shape of the dividing plane 322 of the outer core portion 32. That is, the reactor according to Embodiment 4 is different from the reactor of Embodiment 3 with regard to the longitudinal cross-sectional shape of the dividing plane 322 of the outer core portion 32.

In contrast to Embodiment 1, the dividing plane 322 of the outer core portion 32 is constituted only by a surface that non-orthogonally intersects the vertical direction of the outer core portion 32, and that is parallel to the inward-outward direction of the outer core portion 32. Specifically, the longitudinal cross-sectional shape of the dividing plane 322 is a V-shape on a second cut surface that is parallel both to the vertical direction of the outer core portion 32 and the direction of the magnetic flux in the outer core portion 32 (the parallel arrangement direction of the pair of winding portions 21 and 22). On the second cut surface of the outer core portion 32, end portions of the V-shaped dividing plane 322 intersect left and right sides of the outer core portion 32. As in the case of Embodiment 3 described above, the position in the vertical direction at which the dividing plane 322 is formed refers to a region extending up to ±20% of the length of the outer core portion 32 in the vertical direction from the center of the outer core portion 32 in the vertical direction. In the present example, the entirety of the dividing plane 322 is included within this region.

Operation and Effects

As in the case of Embodiment 1, the reactor according to Embodiment 4 allows the constituent resin of the inner resin portion 5 to sufficiently fill in a gap between each of the winding portions 21 and 22 and the corresponding inner core portion 31 even when the gap is small. Moreover, the reactor according to the present embodiment is excellent in manufacturability. The reason is as follows. Because the longitudinal cross-sectional shape of the dividing plane 322 is a V-shape, the core pieces 321 in the vertical direction can be fitted to each other via a recess and a protrusion defined by the dividing plane 322. Accordingly, the reactor according to the present embodiment facilitates the positioning between the upper and low core pieces 321 of the outer core portion 32.

Embodiment 5

Reactor

Figure 8:
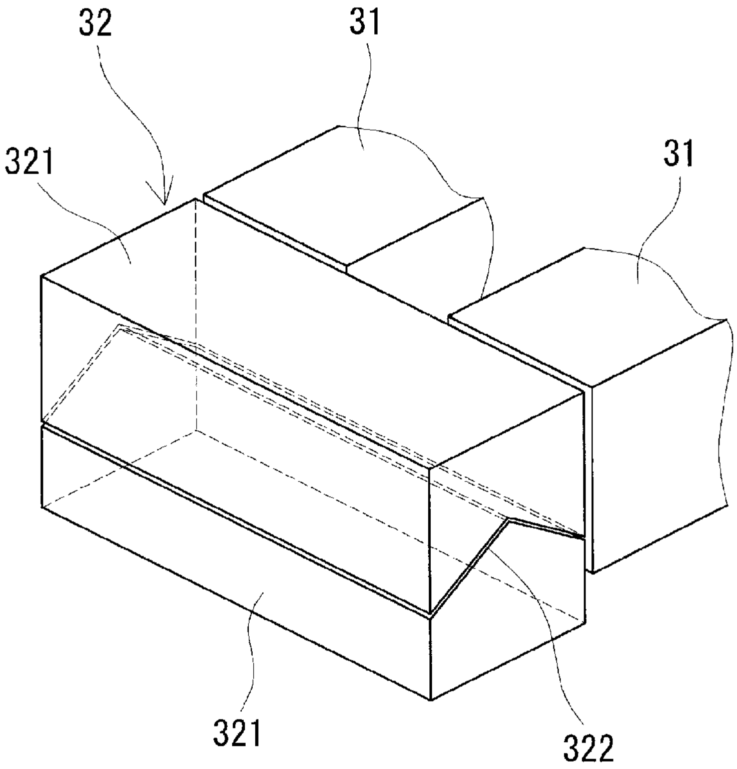
FIG. 8 is a perspective view schematically showing a divided mode of an outer core portion included in a reactor according to Embodiment 5.

A reactor according to Embodiment 5 will be described with reference to FIG. 8. The reactor according to Embodiment 5 is different from Embodiment 1 in that the outer core portion 32 does not include the hole portions 35 (FIGS. 1 to 4), and with regard to the configuration of the dividing plane 322 of the outer core portion 32. In contrast to FIG. 1 and so forth, FIG. 8 shows the shapes of the inner core portion 31 and the outer core portion 32 in a simplified manner. This also applies to FIG. 9, which will be described later.

The dividing plane 322 of the outer core portion 32 includes a surface (nonparallel surface) that intersects the vertical direction of the outer core portion 32, and that intersects the inward-outward direction of the outer core portion 32. The transverse cross-sectional shape of the dividing plane 322 is a V-shape on a first cut surface that is orthogonal to the direction of the magnetic flux in the outer core portion 32 (the parallel arrangement direction of the pair of inner core portions 31). On the first cut surface of the outer core portion 32, end portions of the V-shaped dividing plane 322 intersect left and right (inward-outward direction) sides of the outer core portion 32. As in the case of Embodiments 3 and 4 described above, the position in the vertical direction at which the dividing plane 322 is formed refers to a region extending up to ±20% of the length of the outer core portion 32 in the vertical direction from the center of the outer core portion 32 in the vertical direction. In the present example, the entirety of the dividing plane 322 is included within this region. Although the V-shaped dividing plane 322 is formed so as to protrude in the upward direction of the outer core portion 32 in the present example, the dividing plane 322 may be formed so as to protrude in the downward direction.

Operation and Effects

As in the case of Embodiment 1, the reactor according to Embodiment 5 allows the constituent resin of the inner resin portion 5 to sufficiently fill in a gap between each of the winding portions 21 and 22 and the corresponding inner core portion 31 even when the gap is small. Moreover, with the dividing plane 322, the reactor according to the present embodiment easily reduce the load acting on the outer core portion 32 due to, for example, contact with the constituent resin of the inner resin portion 5 at the time of filling. Therefore, the reactor according to the present embodiment easily inhibits the cracking of the outer core portions 32. Also, as in the case of Embodiment 4, the reactor according to the present embodiment is excellent in manufacturability.

Embodiment 6

Reactor

Figure 9:
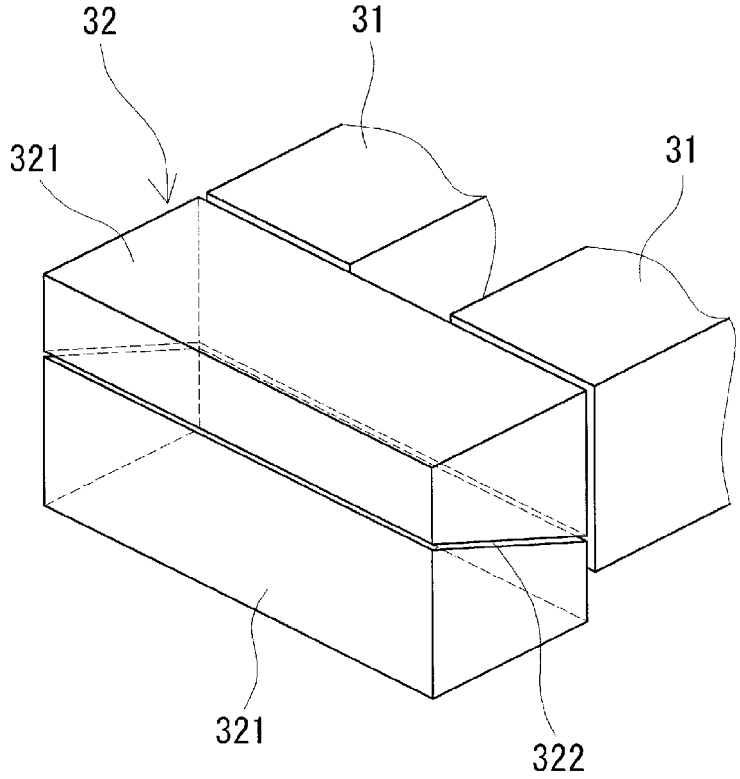
FIG. 9 is a perspective view schematically showing a divided mode of an outer core portion included in a reactor according to Embodiment 6.

A reactor according to Embodiment 6 will be described with reference to FIG. 9. The reactor according to Embodiment 6 is different from Embodiment 1 in that the outer core portion 32 does not include the hole portions 35 (FIGS. 1 to 4), and with regard to the configuration of the dividing plane 322 of the outer core portion 32. The reactor according to Embodiment 6 is different from the reactor of Embodiment 5 with regard to the transverse cross-sectional shape of the dividing plane 322 of the outer core portion 32.

The transverse cross-sectional shape of the dividing plane 322 of the outer core portion 32 is an inclined shape on a first cut surface that is orthogonal to the direction of the magnetic flux in the outer core portion 32 (the parallel arrangement direction of the pair of inner core portions 31). On the first cut surface of the outer core portion 32, end portions of the inclined dividing plane 322 intersect left and right (inward-outward direction) sides of the outer core portion 32. As in the cases of Embodiments 3 to 5 described above, the position in the vertical direction at which the dividing plane 322 is formed refers to a region extending up to ±20% of the length of the outer core portion 32 in the vertical direction from the center of the outer core portion 32 in the vertical direction. In the present example, the entirety of the dividing plane 322 is included within this region. Although the dividing plane 322 of the inclined shape is formed such that the height thereof decreases in a direction from the outer side to the inner side of the outer core portion 32 in the present example, the dividing plane 322 may be formed such that the height thereof increases in a direction from the outer side to the inner side of the outer core portion 32.

Operation and Effects

As in the case of Embodiment 1, the reactor according to Embodiment 6 allows the constituent resin of the inner resin portion 5 to sufficiently fill in a gap between each of the winding portions 21 and 22 and the corresponding inner core portion 31 even when the gap is small. Moreover, with the dividing plane 322, the reactor according to the present embodiment easily reduces the load acting on the outer core portion 32 due to, for example, contact with the constituent resin of the inner resin portion 5. Therefore, the reactor according to the present embodiment easily inhibits the cracking of the outer core portion 32.

The present disclosure is not limited to these examples, but is defined by the claims, and is intended to include all modifications which fall within the scope of the claims and the meaning and scope of equivalents thereof. For example, in each of the reactors according to Embodiments 4 to 6, the outer core portion 32 may have the hole portions 35 (see FIGS. 1 to 4) formed therein. In that case, as in the case of Embodiment 1, the dividing plane 322 may be formed at a position at which the hole portions 35 are divided in the up-down direction, for example.

The invention claimed is:

1. A reactor comprising:

a coil including a winding portion formed by winding a winding wire;

a magnetic core including an inner core portion disposed inside the winding portion, and an outer core portion disposed outside the winding portion; and an inner resin portion filled between an inner circumferential surface of the winding portion and an outer circumferential surface of the inner core portion, wherein, when a vertical direction is a direction orthogonal both to an inward-outward direction of the outer core portion, assuming that a side of the outer core portion that faces the inner core portion is an inner side, and a side opposite to the inner side is an outer side, and to a direction of a magnetic flux excited in the outer core portion, the outer core portion includes a plurality of core pieces coupled in the vertical direction via a dividing plane that intersects the vertical direction; and wherein the outer core portion includes a hole portion extending therethrough in the inward-outward direction, and the dividing plane of the outer core portion divides the hole portion in the vertical direction; and the inner core portion does not have a dividing plane passing therethrough from a surface thereof on one end side toward a surface thereof on another end side in the inward-outward direction.

2. The reactor according to claim 1, wherein the dividing plane of the outer core portion includes a surface parallel to the inward-outward direction.

3. The reactor according to claim 2, wherein the dividing plane of the outer core portion includes a surface orthogonal to the vertical direction.

4. The reactor according to claim 2, wherein each of the core pieces is formed of one of a powder compact containing soft magnetic powder, or a composite material in which soft magnetic powder is dispersed in a resin.

5. The reactor according to claim 1, wherein the dividing plane of the outer core portion includes a surface orthogonal to the vertical direction.

6. The reactor according to claim 5, wherein each of the core pieces is formed of one of a powder compact containing soft magnetic powder, or a composite material in which soft magnetic powder is dispersed in a resin.

7. The reactor according to claim 1, comprising:

an intermediate resin portion filled in the hole portion; and an outer resin portion that covers an outside of the outer core portion, wherein the inner resin portion and the outer resin portion are coupled via the intermediate resin portion.

8. The reactor according to claim 7, wherein each of the core pieces is formed of one of a powder compact containing soft magnetic powder, or a composite material in which soft magnetic powder is dispersed in a resin.

9. The reactor according to claim 1, wherein each of the core pieces is formed of one of a powder compact containing soft magnetic powder, or a composite material in which soft magnetic powder is dispersed in a resin.

* * * * *